United States Patent [19]
Garmendia et al.

[11] Patent Number: 5,199,765
[45] Date of Patent: Apr. 6, 1993

[54] HEADREST FOR CAR SEATS

[75] Inventors: J. Eugenio Garmendia, Zaragoza, Spain; Dieter H. Quistorf, Nauheim, Fed. Rep. of Germany

[73] Assignee: General Motors Corporation, Detroit, Mich.

[21] Appl. No.: 562,714

[22] Filed: Aug. 6, 1990

[30] Foreign Application Priority Data

Aug. 8, 1989 [DE] Fed. Rep. of Germany ....... 3926248

[51] Int. Cl.⁵ .............................................. A47C 7/36
[52] U.S. Cl. .................................. 297/391; 297/409; 297/410
[58] Field of Search ................ 297/408, 391, 409, 410

[56] References Cited

U.S. PATENT DOCUMENTS 4,674,792  6/1987  Tamura et al. ................. 297/409 X
4,779,929  10/1988  Küchemann ................... 297/391 X
4,908,170  3/1990  Kurimoto .

FOREIGN PATENT DOCUMENTS 3018927  12/1981  Fed. Rep. of Germany ...... 297/391
3040846  6/1982  Fed. Rep. of Germany ...... 297/410
3200321  7/1983  Fed. Rep. of Germany ...... 297/410
3817147A1  12/1988  Fed. Rep. of Germany .
82455  5/1985  Japan ................................ 297/410

Primary Examiner—Peter A. Aschenbrenner
Attorney, Agent, or Firm—Raymond I. Bruttomesso, Jr.

[57] ABSTRACT

A headrest with a closed frame consisting of a U-shaped support piece with the two arms of the support piece connected by a crossbar. Two stay bars designed for insertion in a backrest extend from the frame. The frame is covered by a foam-filled, hose-like, protective covering which leaves a central opening in the headrest. The invention also pertains to a method for producing a headrest of this type. The U-shaped support piece is threaded through an opening in the protective covering. The crossbar is inserted into the opening in the protective covering and locked between the arms of the U-shaped support piece. The space between the U-shaped support piece and the crossbar and the protective covering is filled with the foam.

9 Claims, 2 Drawing Sheets

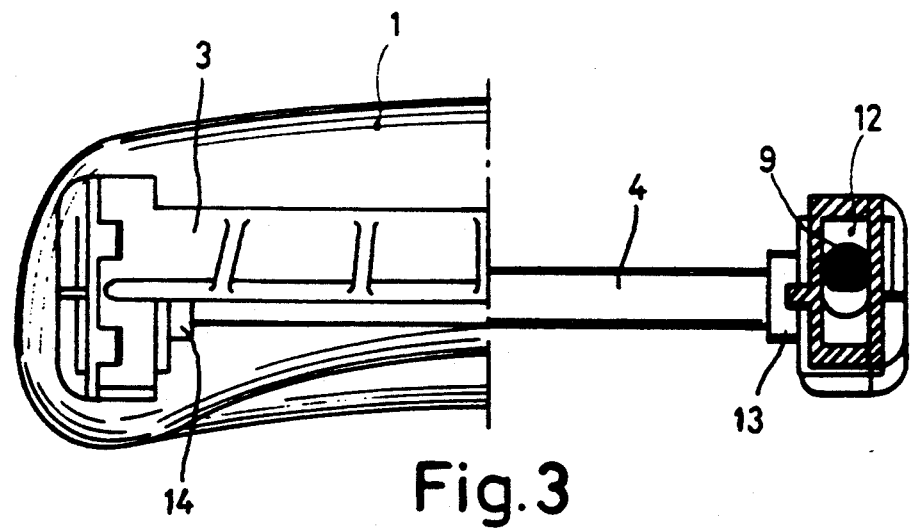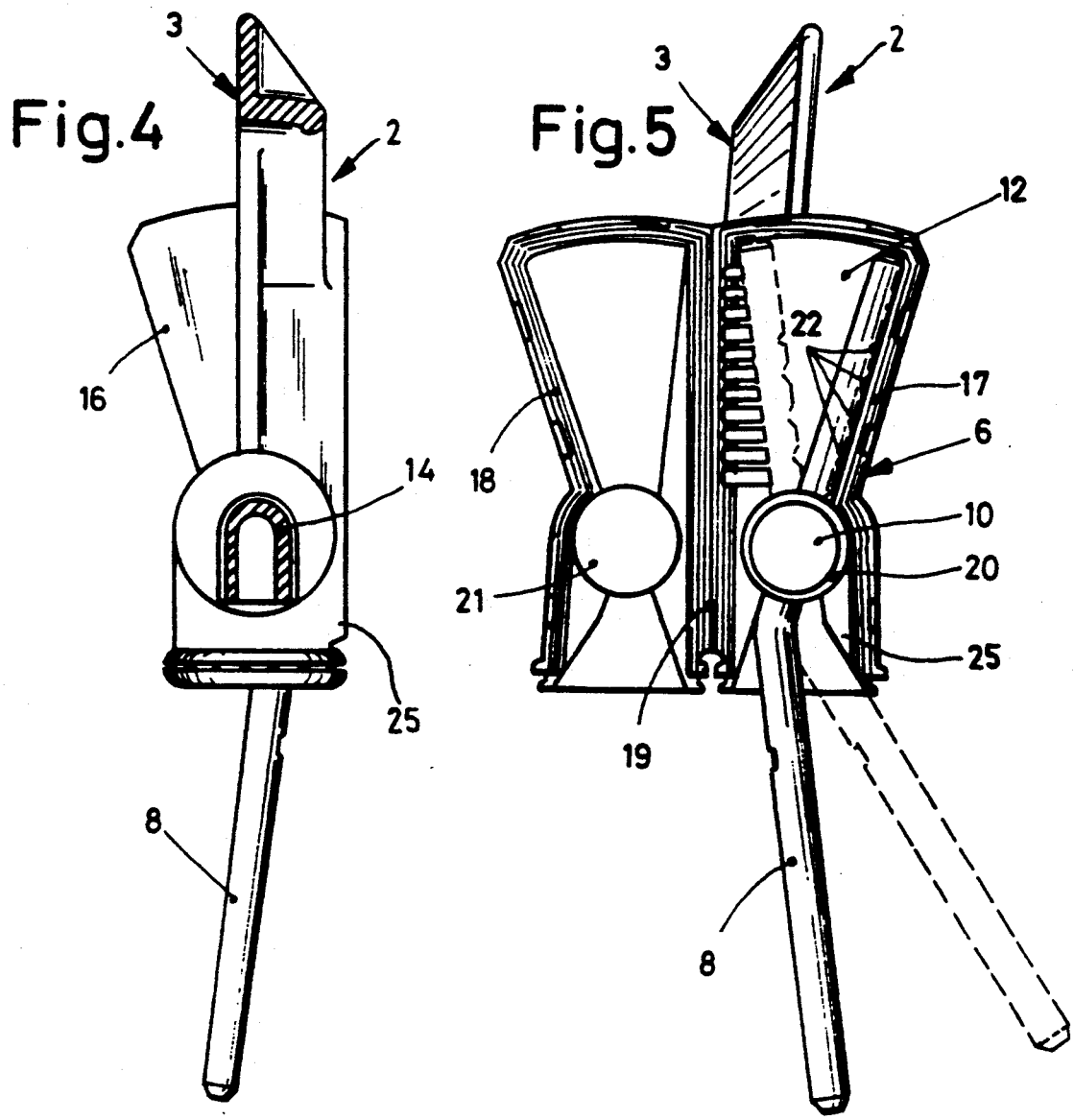

HEADREST FOR CAR SEATS

The invention pertains to a headrest for car seats. The headrest has a closed frame consisting of a U-shaped support piece, the two arms of which are connected by a crossbar. Two stay bars designed for insertion in a backrest extend from the frame The frame is covered by a foam-filled, hose-like protective covering which leaves a central opening in the headrest. The invention also pertains to a method for producing a headrest of this type.

BACKGROUND OF THE INVENTION

A headrest of this type is described, for example in DE-OS 38 17 147. The underside of the protective covering of that headrest has a seam along its entire length, through which the closed frame can be inserted in the protective covering. Closing the relatively long seam requires a good deal of unwanted work. In addition, most people seem to feel that this kind of seam is rather unattractive.

The objective of the invention is to design a headrest of the type specified above in such a way that its protective covering needs only a very small, seam-closed opening for inserting the frame. An additional objective of the invention is the development of a method for producing such a headrest.

The invention achieves the first objective by providing a means of releasable attachment of the crossbar to the arms of the U-shaped support piece.

This design makes it possible to insert the U-shaped support piece into the protective covering with the crossbar detached. This is accomplished by a threading procedure. Therefore, the opening in the protective covering does not need to be any larger than the cross section of the support piece. The crossbar can then be inserted through the same opening and attached to the arms of the support piece, so that the frame becomes closed only after it is inside the protective covering. Due to this design of the invention, only a very small opening is needed in the underside of the protective covering. This improves the appearance of the headrest compared to the known headrest.

In accordance with an advantageous design of the invention, each arm of the U-shaped support piece has a crossbar mounting receptacle that faces downwards. The ends of the crossbar are inserted into these mounts. This makes it especially easy to attach the crossbar to the arms of the U-shaped support piece inside the protective covering.

To prevent unintentional detachment of the crossbar from the support piece, the crossbar mounting receptacle and/or the ends of the crossbar are equipped with locking mechanisms that hold the inserted crossbar securely in place.

Headrests are usually designed to have limited swiveling movement relative to their stay bars. In accordance with an especially advantageous design of the invention, this can be accomplished by mounting each of the stay bars inside the U-shaped support piece in a swivel, which swivels in a bearing. The bearing consists of two bearing shells connected by a film hinge. In the assembled state of the bearing, the bearing shells are folded together.

This bearing design, with two bearing shells connected by a film hinge, is already known in headrests design, as DE-AS 24 05 774 shows. However, in this design, a horizontal detachable crossbar connecting piece, located between the stay bar, forms the swivel axis of the headrest. Therefore, the bearing shells need to be held only by this connecting piece.

The swivels are especially simply designed when they are formed by a cylindrical disk with a radial borehole for receiving a stay bar.

The headrest is held very stably and with strong resistance to bending when, in accordance with another design of the invention, the stay bars pass through the swivel and, above the swivel, extend into a cross-sectionally triangular space inside the U-shaped support piece.

By providing slideable mounting of the stay bars in the swivels, the height of the headrest can be adjusted by moving the stay bars in or out.

If the bearings and U-shaped support piece are designed as one piece, they can be inexpensively produced as a single die-cast part.

The headrest has an especially attractive appearance if the protective covering has an opening that is only as large as the cross section of the U-shaped support piece. The support piece and the crossbar are threaded through the opening, and the opening is sealed before the covering is filled with foam.

The second objective of the invention, i.e., the development of a method for producing a headrest of the type described above, is accomplished in accordance with the invention by first threading a U-shaped support piece through an opening in the protective covering, then inserting a crossbar and locking it in place in the arms of the support piece, and finally, filling the space between the frame (consisting of the U-shaped support piece and the crossbar) and the protective covering with foam.

This method is very simple and therefore inexpensive to perform and produces a headrest that has only a very small seam on its underside for sealing the opening necessary for inserting the disassembled frame.

BRIEF DESCRIPTION OF THE DRAWINGS

The invention offers many different designs. To illustrate the basic principle of the invention, one such design is shown in the drawings and is described below.

FIG. 3 shows a horizontal partial cross section of the headrest along line III—III in FIG. 1.

FIG. 4 is a vertical cross section of the headrest along line IV—IV in FIG. 1.

FIG. 5 is a side view of the headrest without the protective covering.

DESCRIPTION OF THE PREFERRED EMBODIMENT

Figure 1:
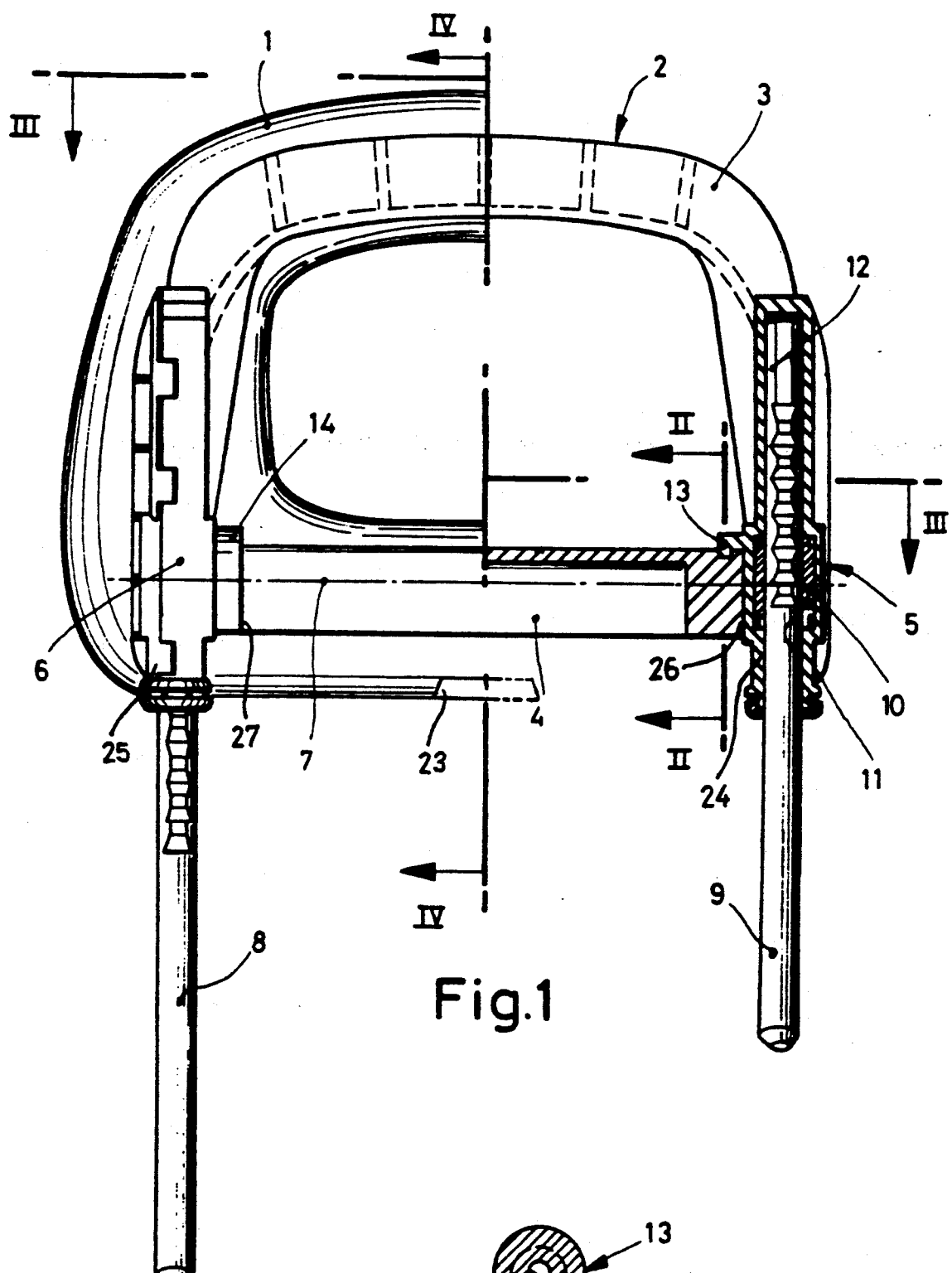
FIG. 1 shows a front view of the headrest, one side of which is cut away and shown without the protective covering.

FIG. 1 shows the headrest in its entirety The headrest has a protective covering 1 which is shown on the left side of the drawing. The protective covering surrounds a closed frame 2, which consists of a U-shaped support piece 3 having a pair of arms 24 and 25 and a detachable crossbar 4, which connects the two arms 24 and 25 of the support piece 3. Each arm of the support piece 3 is equipped with a bearing 5, 6, which allows the headrest limited movement about a horizontal axis 7. To allow a better understanding of the invention, the components are shown on the left side of the drawing, although they are, of course, actually concealed by the protective covering.

Referring to FIG. 1, a pair of stay bars 8, 9 extend downward from the arms of the support piece 3. The stay bars 8 and 9 are mounted in the support piece 3 and can be moved up and down to adjust the weight of the headrest. The right part of FIG. 1 shows that the bearing 5 has a swivel 10 in the form of cylindrical disk. The swivel 10 is mounted in the bearing 5 in such a way that it can rotate about the axis 7. A borehole 11 extends completely through the swivel 10. The stay bar 9 extends through the borehole 11 and is locked into its adjusted height position by means of a locking spring (not shown). As seen in FIG. 5, a space 12 with a triangular cross section is present in the support piece 3 above the bearing 5, 6. The stay bar 8, 9 extend higher or lower into this space 12, and the space 12 limits the maximum possible swiveling of the headrest relative to the stay bars 8, 9.

Figure 2:
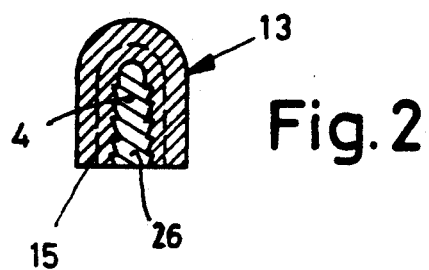
FIG. 2 is a cross section of the headrest along line II—II in FIG. 1.

A pair of mounting receptacles 13 and 14 project towards each other from the arms 24 and 25 of the support piece 3 and open downward. The crossbar 4 has a pair of ends 26 and 27 which are inserted into these mounting receptacles 13 and 14 from below. The cross section in FIG. 2 shows the design of the mounting receptacle 13 in greater detail. We see that the receptacle 13 opens downward and is able to receive the flat end 26 of the crossbar 4. A locking mechanism 15, such as locking barbs located on both the flat end 26 and the mounting receptacle 13, hold the flat end 26 securely in the mounting receptacle 13. The other mounting receptacle 14 and the flat end 27 has a similar locking mechanism, not shown. The looking mechanisms 15, only one shown, hold the crossbar 4 securely in place after the ends 26 and 27 have been inserted into the mounting receptacles 13, 14.

The cross-sectional drawing in FIG. 3 shows the stay bar 9 extending into the cross-sectionally triangular space 12, whose role in limiting the swiveling movement of the headrest is clearly apparent. The protective covering 1 is shown again in the left half of FIG. 3. However, the inside components are shown for the sake of clarity.

In FIG. 4, the mounting receptacle 14 is shown in cross section. The stay bar 8 extends downward from the support piece 3. Since the space 12, which is shown in cutaway form in FIGS. 1 and 3, has a triangular cross section, it must extend beyond the contour of the support piece 3 to ensure sufficient swiveling movement of the headrest. In FIG. 4 this space 12 is located inside the correspondingly triangular projection 16.

The side view in FIG. 5 shows that the bearing 6 consists of two hinged bearing shells 17, 18 connected by a film hinge 19. A cylindrical shell 20, 21 is molded in each of the bearing shells 17, 18. The swivel 10 is seated in the right cylindrical shell 20. The stay bar 8 passes through the the borehole 11 of the swivel 10 and extends into the cross-sectionally triangular space 12. The height of the stay bar 8 can be adjusted, and each height position can be locked. When the bearing shell 18 is folded over onto the bearing shell 17, the cylindrical shell 21 grips the portion of the swivel 10 not seated in the cylindrical shell 20 and thus holds the swivel 10 securely in place.

FIG. 5 also shows notches 22 in the upper part of the stay bar 8. These work together with the locking spring (not shown) to prevent slipping of the headrest on the stay bar 8.

Referring to FIG. 1, the headrest is produced by threading the support piece 3, which is not yet attached to the crossbar 4, through a small opening 23 in the protective covering 1. The crossbar 4 is then inserted through the same opening 23 and locked into the mounting receptacles 13 and 14 mounted on the arms 24 and 25 of the support piece 3. The shall opening 23 is the stitched or otherwise suitably closed. Once this has been accomplished, the protective covering 1 can be filled with a foam to provide it with the necessary cushioning and make the protective covering 1 rigid.

While one embodiment of the present invention has been explained, various modifications within the spirit and scope of the following claims will be readily apparent to those skilled in the art.

The embodiments of the invention in which an exclusive property or privilege is claimed are defined as follows:

1. A headrest for a car seat having a backrest, the headrest comprising:
 a U-shaped support piece having a pair of arms and each arm having a mounting receptacle that opens downward towards the backrest;
 a pair of bearings with each bearing having two bearing shells connected by a film hinge and folded upon each other and one of the bearings mounted in each of the arms of the U-shaped support piece;
 a pair of swivels with on of the swivels rotatably received in each of the bearings;
 a pair of stay bars with one of the stay bars mounted in each of the swivels connecting the arms of the support piece to the backrest of the car seat;
 a foam-filled protective covering that encloses the U-shaped support piece; and
 a crossbar having a pair of ends detachable connected to the mounting receptacles of the arms of the support piece.

2. A headrest as in claim 1 wherein:
 each of the swivels in a cylindrical disk with a radial borehole for receiving one of the stay bars.

3. A headrest as in claim 2, wherein:
 a cross-sectionally triangular space is located in the each of the arms of the U-shaped support piece above the swivels for receiving a portion of the stay bars that passes through the radial boreholes in the swivels.

4. A headrest as in claim 3, wherein:
 the stay bars are slideably mounted in the swivels.

5. A headrest as in claim 4, wherein:
 the bearing and the U-shaped support piece are formed from one piece.

6. A headrest as in claim 1 wherein: the protective covering has an opening for inserting the U-shaped support piece and the crossbar and the opening is sealed before the protective cover in filled with foam.

7. A headrest as in claim 6, wherein:
 the opening for inserting the U-shaped support piece and the crossbar into the protective covering is the size of the cross section of the U-shaped support piece.

8. A headrest for a car seat having a backrest, the headrest comprising:
 a U-shaped support piece having a pair of arms and each arm having a mounting receptacle that opens downward towards the backrest;

a pair of stay bars connecting the arms of the support piece to the backrest of the car seat; a foam-filled protective covering that encloses the U-shaped support piece; and a crossbar having a pair of ends detachably connected to the mounting receptacle of the arms of the support piece.

9. A headrest as in claim 8 wherein:

locking mechanisms interengaging between the ends of the crossbar and the mounting receptacles securing the inserted crossbar.

* * * * *